(12) United States Patent
Bernier et al.

(10) Patent No.: US 7,725,029 B1
(45) Date of Patent: May 25, 2010

(54) TECHNIQUE FOR ASYMMETRIC TRANSPORT

(76) Inventors: Eric Bernier, 101 Macassa Circle, Kanata, ON (CA) K2T 1J9; Dominic John Goodwill, 160 Yoho Drive, Kanata, ON (CA) K2M 2V4

( * ) Notice: Subject to any disclaimer, the term of this patent is extended or adjusted under 35 U.S.C. 154(b) by 586 days.

(21) Appl. No.: 10/917,340

(22) Filed: Aug. 13, 2004

Related U.S. Application Data

(60) Provisional application No. 60/498,352, filed on Aug. 28, 2003.

(51) Int. Cl.
*H04J 14/00* (2006.01)
(52) U.S. Cl. .............................. 398/67; 398/68; 398/74
(58) Field of Classification Search ............ 398/66–68, 398/70–72, 74
See application file for complete search history.

(56) References Cited

U.S. PATENT DOCUMENTS

| | | | | |
|---|---|---|---|---|
| 5,534,912 A | * | 7/1996 | Kostreski | 725/106 |
| 5,880,864 A | * | 3/1999 | Williams et al. | 398/71 |
| 6,333,940 B1 | * | 12/2001 | Baydar et al. | 370/506 |
| 7,002,898 B1 | * | 2/2006 | Lou | 370/204 |
| 2003/0053476 A1 | * | 3/2003 | Sorenson et al. | 370/431 |
| 2004/0136712 A1 | * | 7/2004 | Stiscia et al. | 398/60 |

OTHER PUBLICATIONS

E. Duros, W. Dabbous, H. Izumiyama, N. Fujii, Y. Zhang, "RFC 3077—A Link-Layer Tunneling Mechanism for Unidirectional Links," Mar. 2001.

* cited by examiner

*Primary Examiner*—Dalzid Singh
(74) *Attorney, Agent, or Firm*—Hunton & Williams LLP

(57) ABSTRACT

A technique for asymmetric transport is disclosed. In one particular exemplary embodiment, the technique may be realized by/as a method for asymmetric transport. The method may comprise transmitting, from a network element, at least one first signal through at least one first transport interface at a first rate, where the at least one first transport interface accommodates the transmission of the at least one first signal through an optical medium. The method may also comprise receiving, at the network element, at least one second signal through at least one second transport interface at a second rate different from the first rate, where the at least one second transport interface accommodates the reception of the at least one second signal through the optical medium. At least one of the at least one first transport interface and the at least one second transport interface may be integrated with the network element.

14 Claims, 6 Drawing Sheets

TECHNIQUE FOR ASYMMETRIC TRANSPORT

CROSS-REFERENCE TO RELATED APPLICATIONS

This patent application claims priority to U.S. Provisional Patent Application No. 60/498,352, filed Aug. 28, 2003, which is hereby incorporated by reference herein in its entirety.

FIELD OF THE DISCLOSURE

The present disclosure relates generally to network communications and, more particularly, to a technique for asymmetric transport.

BACKGROUND OF THE DISCLOSURE

Video-on-Demand (VoD) services have traditionally been deployed using distributed VoD servers and DVB-ASI (Asynchronous Serial Interface standard developed by the European Digital Video Broadcasting standards association) or ATM (asynchronous transfer mode) transport. Transport and storage economics previously favored a decentralized approach that minimized transport at the expense of higher storage and operation costs. More recently, however, due to the commoditization of Gigabit Ethernet (GbE) equipment, substantial cost reductions in 10 Gigabit Ethernet (10GE) transmission and switching, rising storage requirements for on-demand content, and the high cost of network operations, a centralized approach for VoD services is considered more desirable. Accordingly, much of the multi-service operator (MSO) industry has begun deploying centralized architectures using GbE or 10GE transport. Using this infrastructure, MSO's are offering a variety of residential services and business services, such as cable TV, voice telephony, and data services.

The centralization of video servers provides several advantages. For example, server resources are shared among a much larger system. The cost of operating the network becomes lower due to fewer server sites. Much larger content selections can be accommodated without significant impact to overall storage cost. Content duplication becomes minimal; therefore content management and updates become simpler and easier.

As a result of server centralization, the corresponding transport network becomes an integral part of the VoD solution. MSOs are evolving their transport infrastructure from native DVB-ASI based networks to an Ethernet based infrastructure. However, none of them have achieved a cost-efficient solution, that can not only ensure that migrating to the new infrastructure does not disrupt services to current customers, but also protect the operator's investment in installed equipment.

In view of the foregoing, it would be desirable to provide a transport solution which overcomes the above-described inadequacies and shortcomings.

SUMMARY OF THE DISCLOSURE

According to the present disclosure, a technique for asymmetric transport is provided. In one particular exemplary embodiment, the technique may be realized by/as a method for asymmetric transport. The method may comprise transmitting, from a network element, at least one first signal through at least one first transport interface at a first rate, where the at least one first transport interface accommodates the transmission of the at least one first signal through an optical medium. The method may also comprise receiving, at the network element, at least one second signal through at least one second transport interface at a second rate different from the first rate, where the at least one second transport interface accommodates the reception of the at least one second signal through the optical medium. At least one of the at least one first transport interface and the at least one second transport interface may be integrated with the network element.

In accordance with other aspects of this particular exemplary embodiment of the present disclosure, the method may further comprise transmitting, from the network element, at least one third signal through the at least one second transport interface at a third rate different from the first rate, where the at least one second transport interface accommodates the transmission of the at least one third signal through the optical medium.

In accordance with further aspects of this particular exemplary embodiment of the present disclosure, the transmission of the at least one first signal through the optical medium may be unidirectional.

In accordance with additional aspects of this particular exemplary embodiment of the present disclosure, the transmission of the at least one first signal may be aggregated from a plurality of transmissions at a lower rate than the first rate.

In accordance with another aspect of this particular exemplary embodiment of the present disclosure, the transmission of the at least one first signal and the reception of the at least one second signal through the optical medium may be based on a wavelength division multiplexing (WDM) technique. The at least one first signal may be directed to a plurality of destinations through an optical add/drop multiplexer.

In accordance with yet another aspect of this particular exemplary embodiment of the present disclosure, a first connection between the first network element and the at least one first transport interface may be bi-directional. A second connection between the second network element and the at least one second transport interface may be bi-directional.

In accordance with still another aspect of this particular exemplary embodiment of the present disclosure, the network element may be a network switch or router. Specifically, he network element may be an Ethernet switch. The first rate may be ten gigabits per second (10 Gbps) and the second rate is one gigabits per second (1 Gbps).

In accordance with a further aspect of this particular exemplary embodiment of the present disclosure, at least one of the at least one first signal and the at least one second signal may be encapsulated in a signal containing forward error correction.

In accordance with a still further aspect of this particular exemplary embodiment of the present disclosure, the at least one first signal may be part of a multi-service operator's downstream signal and the at least one second signal may be part of the multi-service operator's upstream signal. Specifically, the at least one first signal may be part of a Video-on-Demand downstream signal and the at least one second signal may be part of a Video-on-Demand upstream signal.

In another particular exemplary embodiment, the technique may be realized by/as at least one signal embodied in at least one carrier wave for transmitting a computer program of instructions configured to be readable by at least one processor for instructing the at least one processor to execute a computer process for performing the method as recited above.

In yet another particular exemplary embodiment, the technique may be realized by/as at least one processor readable carrier for storing a computer program of instructions configured to be readable by at least one processor for instructing the at least one processor to execute a computer process for performing the method as recited above.

In still another particular exemplary embodiment, the technique may be realized by/as apparatus for asymmetric transport. The apparatus may comprise a network element, at least one first transport interface and at least one second transport interface, where the at least one first transport interface accommodates a transmission, from the network element, of at least one first signal through an optical medium at a first rate, and the at least one second transport interface accommodates a reception, at the network element, of at least one second signal through the optical medium at a second rate different from the first rate.

In accordance with one aspect of this particular exemplary embodiment of the present disclosure, at least one of the at least one first transport interface and the at least one second transport interface may be integrated with the network element.

In a further particular exemplary embodiment, the technique may be realized by/as a system for asymmetric transport. The system may comprise a first network element coupled with at least one first transport interface. The system may also comprise a second network element coupled with at least one second transport interface. The system may further comprise an optical medium between the at least one first transport interface and the at least one second transport interface. The at least one first transport interface and the at least one second transport interface may accommodate a first transmission of at least one first signal from the first network element to the second network element through the optical medium at a first rate. And the at least one first transport interface and the at least one second transport interface may accommodate a second transmission of at least one second signal from the second network element to the first network element through the optical medium at a second rate different from the first rate.

In accordance with one aspect of this particular exemplary embodiment of the present disclosure, at least part of the at least one first transport interface may be integrated with the first network element and at least part of the at least one second transport interface may be integrated with the first network element.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as disclosed and claimed herein, and with respect to which the present disclosure could be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENT(S)

Figure 1:
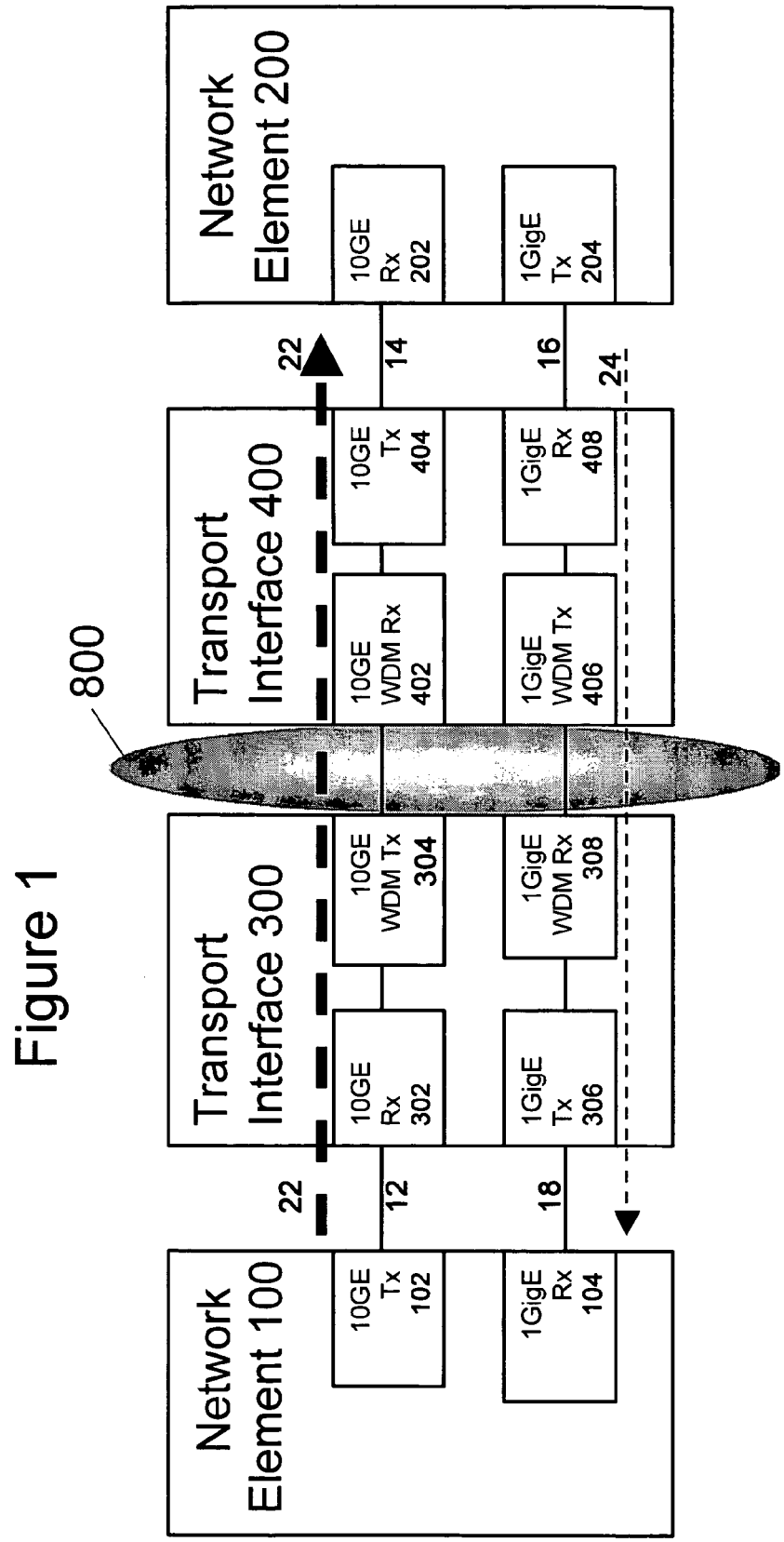
FIG. 1 is a block diagram illustrating an exemplary system for asymmetric transport in accordance with an embodiment of the present disclosure.

Referring to FIG. 1, there is shown a block diagram illustrating an exemplary system for asymmetric transport in accordance with an embodiment of the present disclosure. This exemplary system comprises a first Network Element 100, a second Network Element 200, a first Transport Interface 300, a second Transport Interface 400, an optical medium 800, and a plurality of connections among them.

Network Element 100 may be a network switch or router with additional connections to other network elements. In a VoD transport system, Network Element 100 may be an Ethernet switch which is also part of a master head-end that manages the VoD services. To facilitate asymmetric data flows, Network Element 100 may support an Unidirectional Link Routing Protocol (UDLR). For example, Network Element 100 may implement a link-layer tunneling mechanism (as described in the Internet Engineering Task Force Request-for-Comments 3077) that allows a set of nodes which are directly connected by a unidirectional link to send datagrams as if they were all connected by a bidirectional link. Network Element 100 may further comprise a 10 Gigabit Ethernet (10GE) transmitter 102 and a One Gigabit Ethernet (GigE) receiver 104.

Network Element 100 may be coupled with Transport Interface 300 via a 10GE Interconnect 12 and a GigE Interconnect 18. The 10GE Interconnect 12 may be an Ethernet connection, unidirectional or bi-directional, with a bandwidth of 10 gigabits per second (Gbps). And the GigE Interconnect 18 may be an Ethernet connection, unidirectional or bi-directional, optical or electrical, with a bandwidth of 1 Gbps.

Transport Interface 300 may function as an interface between Network Element 100 and the optical medium 800. Transport Interface 300 may comprise a 10GE receiver 302, 10GE wavelength division multiplexing (WDM) transmitter 304, a GigE WDM receiver 308 and a GigE transmitter 306. The 10GE receiver 302 may receive a downstream data flow 22 transmitted by the 10GE transmitter 102. In a VoD transport system, the downstream data flow 22 may comprise video contents to be distributed from a master head-end to VoD subscribers, for example. The downstream data flow 22 may be transmitted from Network Element 100 to Transport Interface 300 in the form of electrical signals or in a first form of optical signals. These signals may then be converted by the 10GE WDM transmitter 304 into a second form of optical signals suitable for transport through the optical medium 800.

To accommodate transport of optical signals in the optical medium 800, Transport Interface 300 may provide a plurality of functions such as framing, forward error correction (FEC) and dispersion compensation.

The optical medium 800 may comprise a network of optical fibers that allows high-speed transport of the downstream dataflow 22 in the form of optical signals.

Transport Interface 400 is also connected with the optical medium 800. Transport Interface 400 may comprise a 10GE WDM receiver 402, a 10GE transmitter 404, a GigE receiver 408 and a GigE WDM transmitter. The optical signals carrying the downstream data flow 22 may be received by the 10GE WDM receiver 402, converted to a suitable form of signals (electrical or optical), and transmitted by the 10GE transmitter 404 to Network Element 200. Similar to Transport Interface 300, Transport Interface 400 may also provide functions such as framing, forward error correction (FEC) and dispersion compensation.

Network Element 200 may be coupled with Transport Interface 400 via a 10GE Interconnect 14 and a GigE Interconnect 16. Network Element 200 may comprise a 10GE receiver 202 and a GigE transmitter 204. The signals carrying the downstream data flow 22 may be received by the 10GE receiver and routed to a server or Ethernet connected with Network Element 200. In a VoD transport system, Network Element 200 may be an Ethernet switch as part of a primary hub that distributes video contents to other hubs and users that are located further downstream.

In addition to the downstream data flow 22, there may be an upstream data flow 24. In a VoD transport system, the upstream data flow 24 may comprise a variety of data sent from the users or network elements back to the master head-end. The upstream data may include VoD control signals, VoIP data and user uploads, for example. The upstream data flow 24, in the form of electrical or optical signals, may be transmitted from the GigE transmitter 204, over the GigE Interconnect 16, to the GigE receiver 408. The GigE WDM transmitter 406 may convert the signals carrying the upstream data flow 24 into optical signals suitable for transport through the optical medium 800. The optical signals may be transmitted to Transport Interface 300 and converted by the GigE WDM receiver 308 back to a signal format suitable for transmission by the GigE transmitter 306. The converted signals carrying the upstream data flow 24 may then be transmitted by the GigE transmitter 306, over the GigE Interconnect 18, to the GigE receiver 104. The upstream data flow 24 may then be further processed or routed by Network Element 100.

For cost reduction purposes, it may be desirable for an MSO to implement an asymmetric transport infrastructure as depicted in FIG. 1, where the downstream and upstream data are transported in separate unidirectional channels with different bandwidths. Video-on-Demand services typically create a substantially asymmetric data flow pattern in the transport network. Bandwidth intensive video streams flow from a head-end to a quadrature amplitude modulation (QAM) converter, while lower bandwidth control signals flow back to the head-end. Even when other more symmetrical services such as Voice-over-IP (VoIP), commercial services, and/or IT traffic are transported over the same infrastructure, downstream video bandwidth may still outweigh upstream bandwidth requirements. For transport of video contents alone, the transport layer does not need bi-directional communication except for disabling backward error indicators if a framing protocol is used, enabling an alternative communication channel for controlling transport equipment, and providing a path for acquiring Address Resolution Protocol (ARP) and Machine Authentication Code (MAC) from the QAM modulators. In many cases, all of these upstream traffic may be carried by a separate network, enabling the use of a unidirectional, un-protected transport layer that can offer substantial savings in the cost of laser and fiber. Most transport components today are implemented as bi-directional and therefore may require some modification and/or optimization in order to adapt to the above-described asymmetric unidirectional transport of VoD services.

According to one embodiment of the disclosure, the upstream channel may be either unidirectional or bi-directional depending on specific applications.

According to embodiments of the disclosure, the transport of optical signals in the optical medium 800 may be based on either dense wavelength division multiplexing (DWDM) or coarse wavelength division multiplexing (CWDM). CWDM may offer simple, low-cost and easy-to-deploy connectivity when it is implemented in a relatively simple network environment (e.g., small photonic domain, small number of optical add/drop multiplexer (OADM) locations, no optical dispersion compensators, moderate distance and moderate capacity). These requirements are best met when CWDM systems are deployed in a linear network to multiply point-to-point fiber capacity. One application for CWDM in a MSO environment is to transport Gigabit Ethernet, protected or un-protected, between secondary hubs and local distribution hubs. However, for more complex transport solutions such as those required for VoD services, DWDM may be more suitable. For optimal deployment flexibility as well as compatibility and interoperability among different transport networks, it may be desirable to implement pluggable standards-based DWDM transmitters and receivers. For example, encapsulated 10GE DWDM transmitters and receivers may be used in Transport Interfaces 300 and 400. These encapsulated 10GE DWDM modules may be configured to support 10GE wide area network (WAN), local area network (LAN), ITU G.709 and OC192 standards, and forward error correction (FEC).

In order to take advantage of maturing Gigabit Ethernet interface technologies yet protect capital investment in its installed equipment, a MSO may choose to gradually and seamlessly migrate from a first-generation transport infrastructure to more integrated architectures without negative impact on the current services. These integrated architectures are described below in connection with FIGS. 2 and 3.

Figure 2:
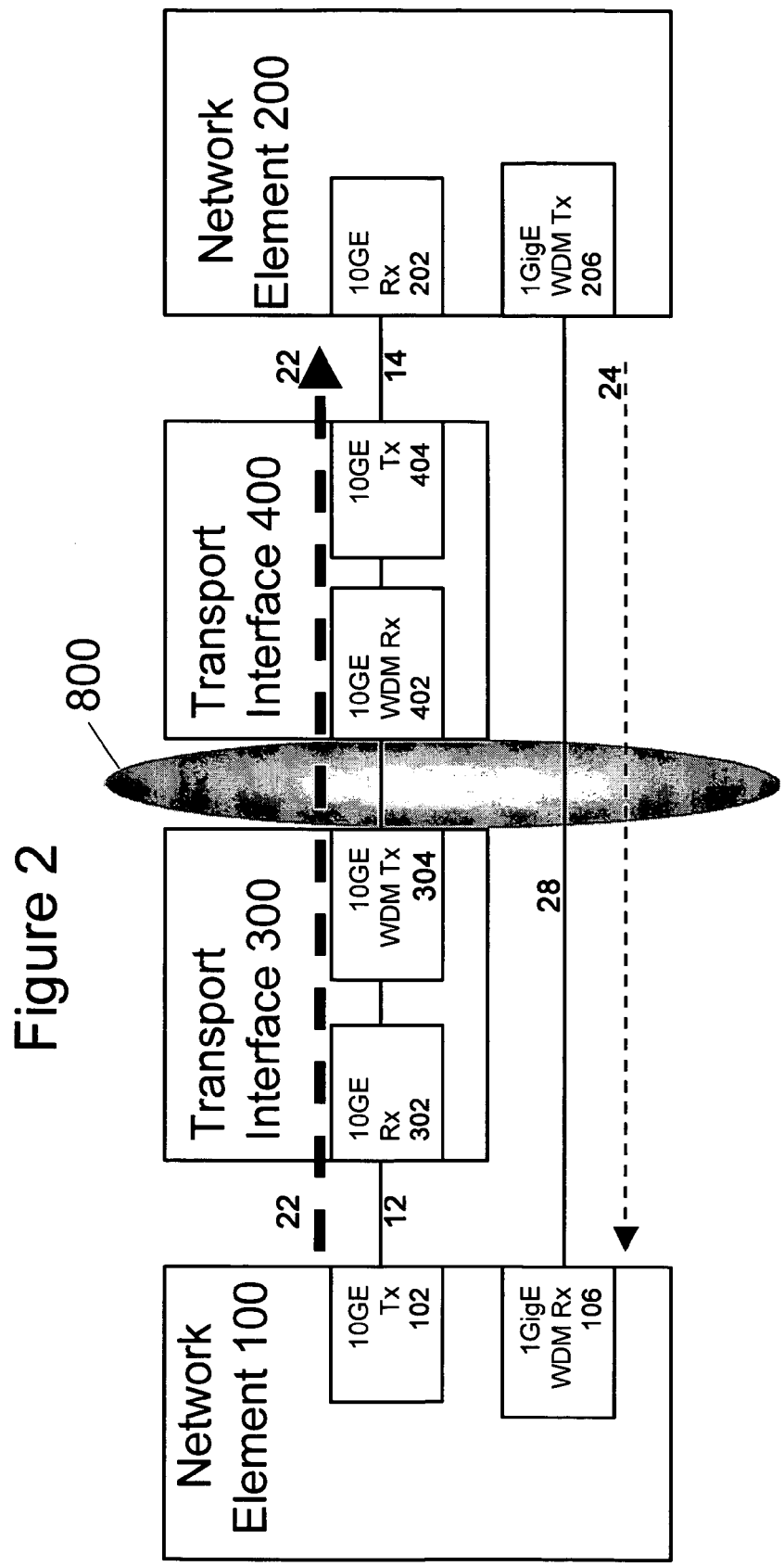
FIG. 2 is a block diagram illustrating another exemplary system for asymmetric transport in accordance with an embodiment of the present disclosure.

FIG. 2 is a block diagram illustrating another exemplary system for asymmetric transport in accordance with an embodiment of the present disclosure. In this exemplary system, the parts of Transport Interface 300 and Transport Interface 400 that accommodate the GigE data flow are integrated with Network Element 100 and Network Element 200 respectively. As a result, optical signals carrying the upstream data flow 24 may be transmitted by a GigE WDM transmitter 206, directly into the optical medium 800, and received by a GigE WDM receiver 106. If a bi-directional GigE channel is desired, GigE WDM transceivers may be implemented in place of the transmitter 206 and the receiver 106. These GigE WDM modules may be encapsulated components supporting multiple standards and forward error correction (FEC).

Figure 3:
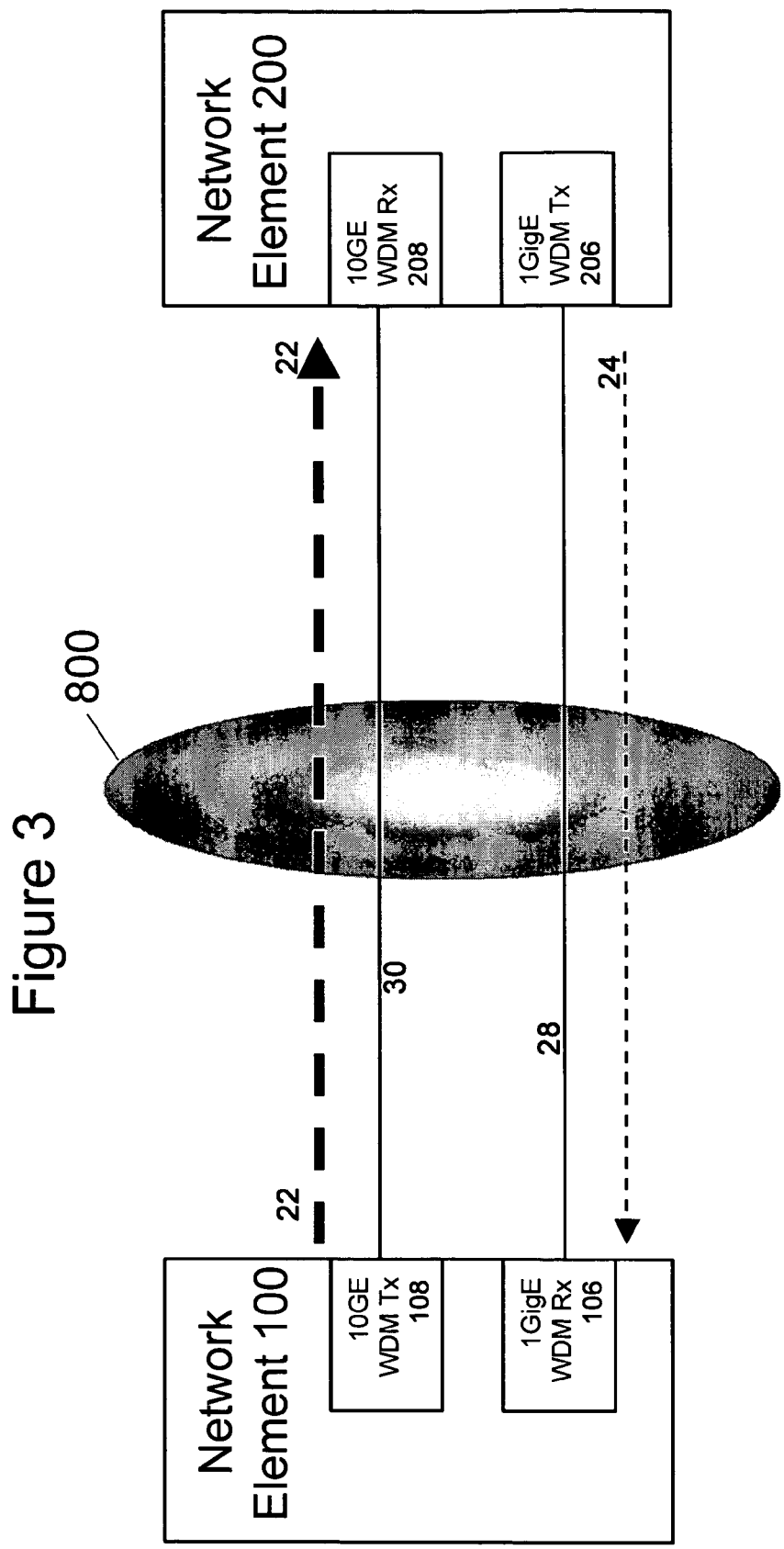
FIG. 3 is a block diagram illustrating yet another exemplary system for asymmetric transport in accordance with an embodiment of the present disclosure.

FIG. 3 is a block diagram illustrating yet another exemplary system for asymmetric transport in accordance with an embodiment of the present disclosure. This exemplary system is further improved from the systems shown in FIGS. 1 and 2. Transport Interface 300 and Transport Interface 400 may be eliminated by integrating the 10GE components into Network Element 100 and Network Element 200 respectively. As a result, a 10GE WDM transmitter 108 may transmit the downstream data flow 22 directly into the optical medium 800. At the other end, the optical signals carrying the downstream data flow 22 may be directly picked up and converted by a 10GE WDM receiver 208. Both the transmitter 206 and receiver 208 may be encapsulated components.

Figure 6:
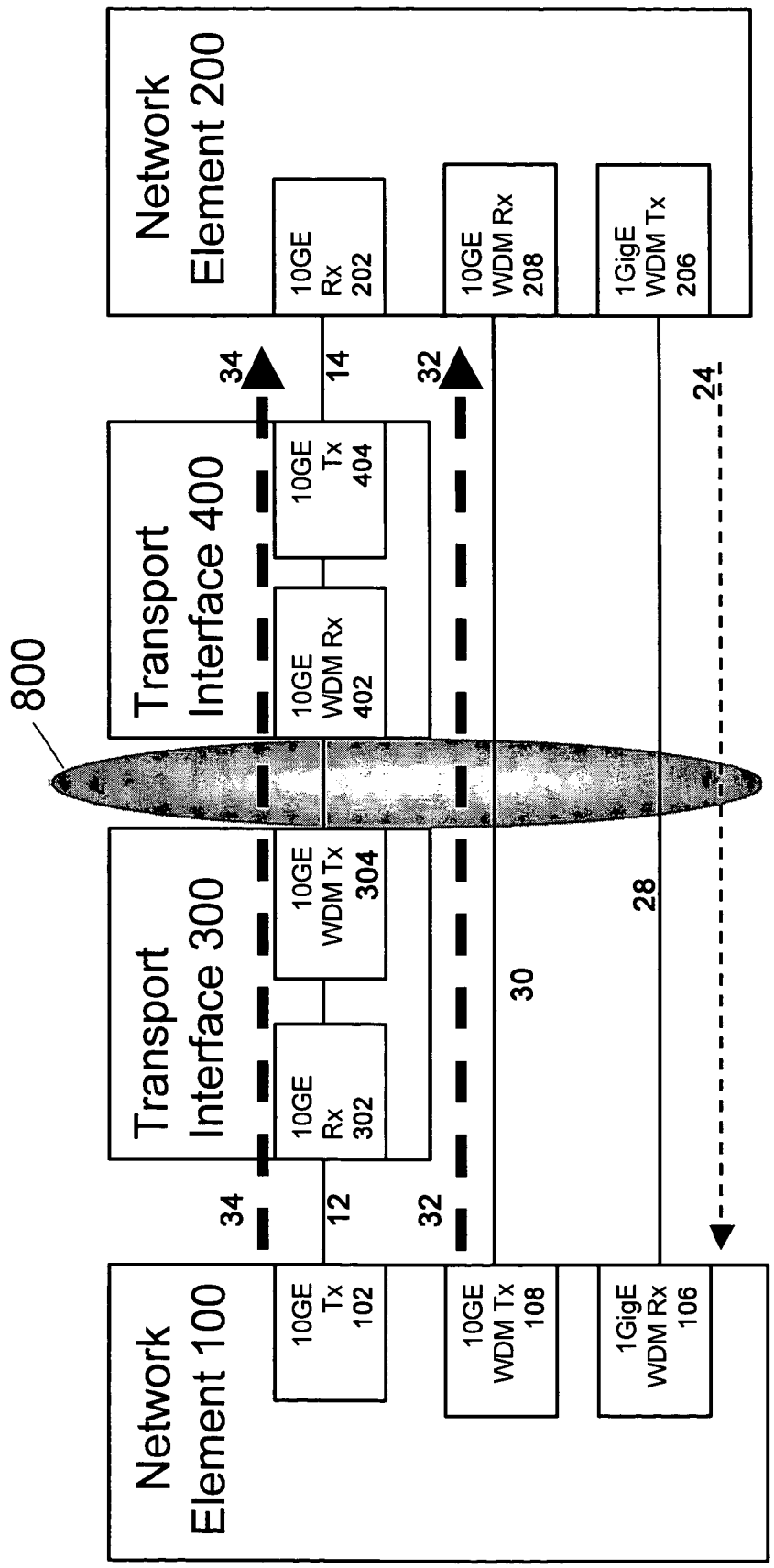
FIG. 6 is a block diagram illustrating a further exemplary system for asymmetric transport in accordance with an embodiment of the present disclosure.

To protect a MSO's investment in its installed equipment, it may be desirable to implement embodiments of the present disclosure on legacy networks in a "mixed mode." One example is shown in FIG. 6, wherein the stand-alone transport interfaces (300 and 400) co-exist with the integrated interfaces (i.e., 10GE DWDM transmitter 108 and 10GE DWDM receiver 208). Depending specific applications and/or customer requirements, the original downstream data flow 22 may be split into two separate downstream data flows 32 and 34. While the downstream data flow 32 is transmitted directly from the Network Element 100 into the optical medium 800, the downstream data flow 34 may be transmitted using legacy equipment.

Figure 4:
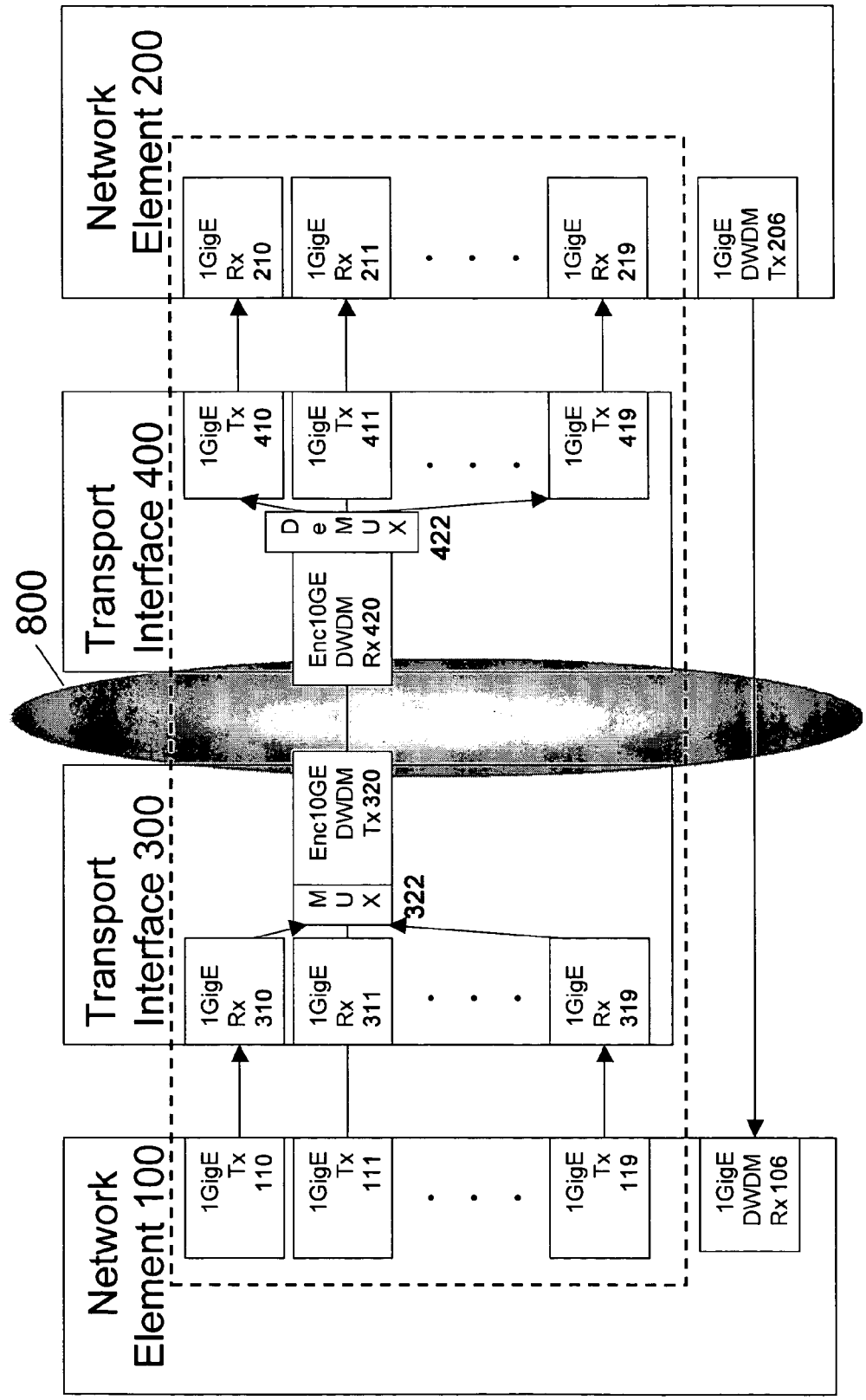
FIG. 4 is a block diagram illustrating still another exemplary system for asymmetric transport in accordance with an embodiment of the present disclosure.

According to an embodiment of the disclosure, the 10GE Interconnect 12 and the 10GE interconnect 14 in FIGS. 1 and 2 may be achieved by aggregating multiple GigE interconnects. One example is illustrated in FIG. 4. The 10GE transmitter 102 in FIG. 2 is now replaced with a plurality of GigE transmitters (110, 111 . . . 119 etc). The downstream data are transmitted, via a plurality of GigE interconnects, to a plurality of GigE receivers (310, 311 . . . 319 etc) in Transport Interface 300. The downstream data may then pass through a multiplexer (MUX) 322, and be processed for optical transmission by an encapsulated 10GE DWDM transmitter 320. The MUX 322 may be an optical add/drop multiplexer (OAM) that is capable of receiving a single stream of input and direct it to multiple destinations. On the receiving end, the optical signals carrying the downstream data may be decoded by an encapsulated 10GE DWDM receiver 420, filtered with a de-multiplexer (DeMUX) 422, and transmitted over a plurality of GigE interconnects to Network Element 200. A decision as to whether to replace a 10GE interconnect with multiple GigE interconnects and the number of GigE interconnects needed may depend on data transport requirements and cost-reduction considerations.

Figure 5:
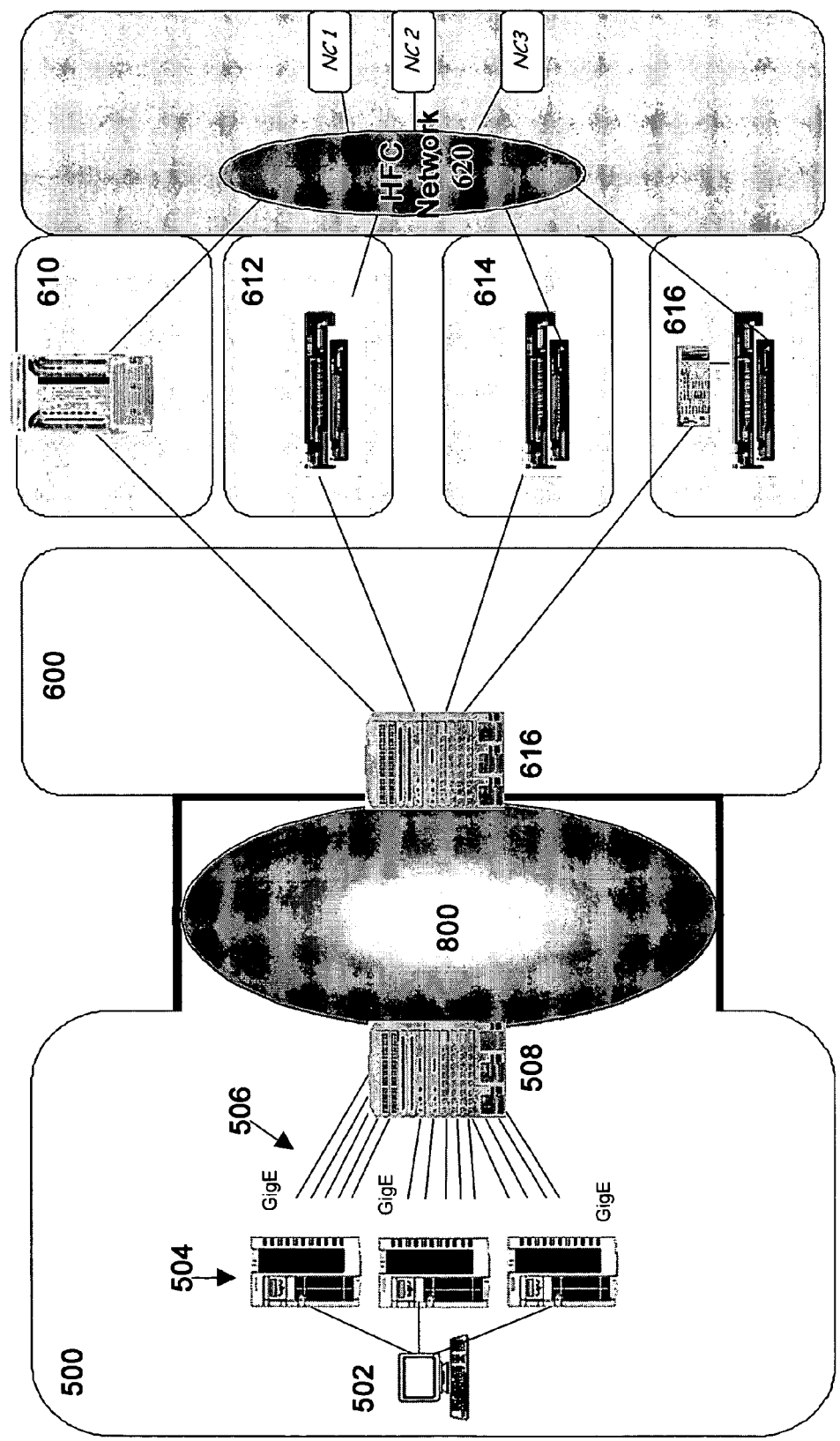
FIG. 5 is a block diagram illustrating an exemplary system for asymmetric transport of VoD services in accordance with an embodiment of the present disclosure.

FIG. 5 is a block diagram illustrating an exemplary system for asymmetric transport of VoD services in accordance with an embodiment of the present disclosure. The exemplary system comprises a master head-end 500, the optical medium 800, a secondary head-end 600, secondary hubs (610, 612, 614 and 616) and a hybrid fiber coaxial (HFC) network 620.

The master head-end 500 may comprise an Asset Management & Billing module 502, a plurality of master library servers 504, a MSO converged box 508 and a plurality of Gigabit Ethernet interconnects 506 between 504 and 508. The MSO converged box 508 may comprise a DWDM transport interface converged with a multi-service switching platform. The MSO converged box 508 may support asymmetric unidirectional transport of VoD contents with DWDM pluggable GigE and 10GE gigabit interface converters (GBIC's).

The secondary head-end 600 may comprise another MSO converged box which is connected to the plurality of secondary hubs. Each secondary hub may comprise a MSO converged box which is based on a multi-service switch capable of delivering a variety of data, voice, and video services. For example, secondary hub 610 may support optical transport via GBIC's. QAM modulators may be integrated into the MSO converged box together with a cable modem termination system (CMTS) and its traffic management functions.

According to one embodiment of the disclosure, it may be desirable to only multiplex CMTS data at the secondary hub and then backhaul all traffic to the secondary head-end 600 or the master head-end 500. This may reduce operational complexity and further commoditize the edge switch platform. Though centralized intelligence may come at the expense of higher transport costs for CMTS data, backhauling CMTS traffic is seen as practical given its traffic volume relative to video traffic. An additional benefit of this approach may be that there will be fewer points in the network to interrupt real time packet flows, e.g., those associated with VoIP and "video phone" applications.

In Video-on-Demand operations, video contents may be retrieved from the master library servers 504, delivered to the MSO converged box 508, converted into optical signals and transported through the optical medium 800. Once The MSO converged box 616 received the transmission, the optical signals may be converted and delivered to secondary hubs and then further routed through a HFC network 620 to downstream VoD subscribers (NC1, NC2 and NC3 etc). The VoD control signals and other upstream data may be transported via a separate lower-bandwidth path back to the master head-end 500.

At this point it should be noted that the technique for asymmetric transport in accordance with the present disclosure as described above typically involves the processing of input data and the generation of output data to some extent. This input data processing and output data generation may be implemented in hardware or software. For example, specific electronic components may be employed in a computer and/or communications network or similar or related circuitry for implementing the functions associated with asymmetric transport in accordance with the present disclosure as described above. Alternatively, one or more processors operating in accordance with stored instructions may implement the functions associated with asymmetric transport in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the following appended claims. Further, although the present disclosure has been described herein in the context of a particular implementation in a particular environment for a particular purpose, those of ordinary skill in the art will recognize that its usefulness is not limited thereto and that the present disclosure can be beneficially implemented in any number of environments for any number of purposes. Accordingly, the claims set forth below should be construed in view of the full breath and spirit of the present disclosure as disclosed herein.

The invention claimed is:

1. A system for asymmetric transport, the system comprising:
  a first network element coupled with at least one first transport interface;
  a second network element coupled with at least one second transport interface;
  an optical medium between the at least one first transport interface and the at least one second transport interface;
  wherein the at least one first transport interface and the at least one second transport interface accommodate a first transmission of at least one first signal from the first network element to the second network element through the optical medium at a first rate; and wherein the at least one first transport interface and the at least one second transport interface accommodate a second transmission of at least one second signal from the second network element to the first network element through the optical medium at a second rate different from the first rate;

wherein at least part of the at least one first transport interface is at least a first part of the first network element and at least part of the at least one second transport interface is at least a first part of the second network element.

2. The system according to claim 1, wherein the first transmission of the at least one first signal from the first network element to the second network element through the optical medium is unidirectional.

3. The system according to claim 1, wherein the first transmission of the at least one first signal from the first network element to the second network element is aggregated from a plurality of transmissions at a lower rate than the first rate.

4. The system according to claim 1, wherein the first transmission of the at least one first signal from the first network element to the second network element and the second transmission of the at least one second signal from the second network element to the first network element through the optical medium are based on a wavelength division multiplexing (WDM) technique.

5. The system according to claim 4, wherein the at least one first signal is directed to a plurality of destinations through an optical add/drop multiplexer.

6. The system according to claim 1, further comprising a first connection between the first network element and the at least one first transport interface wherein the first connection is bi-directional.

7. The system according to claim 1, further comprising a second connection between the second network element and the at least one second transport interface wherein the second connection is bi-directional.

8. The system according to claim 1, wherein at least one of the first network element or the second network element is a network switch or router.

9. The system according to claim 1, wherein at least one of the first network element or the second network element is an Ethernet switch.

10. The system according to claim 1, wherein the first rate is ten gigabits per second (10 Gbps) and the second rate is one gigabits per second (1 Gbps).

11. The system according to claim 1, wherein at least one of the at least one first signal and the at least one second signal is encapsulated in a signal containing forward error correction.

12. The system according to claim 1, wherein the at least one first signal is part of a multi-service operator's downstream signal and the at least one second signal is part of the multi-service operator's upstream signal.

13. The system according to claim 1, wherein the at least one first signal is part of a Video-on-Demand downstream signal and the at least one second signal is part of a Video-on-Demand upstream signal.

14. The system according to claim 1, wherein the first transmission of the at least one first signal from the first network element to the second network element is split into two disparate transmissions.

* * * * *